(12) United States Patent
Chen et al.

(10) Patent No.: US 8,942,000 B2
(45) Date of Patent: Jan. 27, 2015

(54) LEAD LINE STRUCTURE AND DISPLAY PANEL HAVING THE SAME

(75) Inventors: Chien-Li Chen, Taichung (TW);
Pei-Ling Chiang, Taipei (TW);
Wei-Hsin Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 596 days.

(21) Appl. No.: 13/208,359

(22) Filed: Aug. 12, 2011

(65) Prior Publication Data
US 2012/0281369 A1 Nov. 8, 2012

(30) Foreign Application Priority Data

May 5, 2011 (TW) .............................. 100115771 A

(51) Int. Cl.
| | | |
|---|---|---|
| *H05K 1/00* | (2006.01) | |
| *H05K 1/18* | (2006.01) | |
| *H05K 7/00* | (2006.01) | |
| *G02F 1/1345* | (2006.01) | |
| *G02F 1/1333* | (2006.01) | |

(52) U.S. Cl.
CPC ........ *G02F 1/1345* (2013.01); *G02F 1/133345* (2013.01)
USPC ...................................... 361/748; 361/679.01

(58) Field of Classification Search
USPC ...................... 361/56, 84, 139, 149; 349/106, 349/150–152
See application file for complete search history.

(56) References Cited

U.S. PATENT DOCUMENTS

| | | | |
|---|---|---|---|
| 5,757,450 | A | 5/1998 | Fujii et al. |
| 7,956,978 | B2 * | 6/2011 | Zhang ........................... 349/153 |
| 8,259,276 | B2 * | 9/2012 | Tseng et al. ................... 349/149 |
| 8,355,087 | B2 * | 1/2013 | Yeh et al. ......................... 349/42 |
| 8,405,809 | B2 * | 3/2013 | Lee et al. ....................... 349/138 |
| 8,643,820 | B2 * | 2/2014 | Zhang et al. ................... 349/153 |
| 2013/0235020 | A1 * | 9/2013 | Kim et al. ...................... 345/212 |

FOREIGN PATENT DOCUMENTS

| | | |
|---|---|---|
| JP | 2001-305569 | 10/2001 |
| JP | 2007-079357 | 3/2007 |
| JP | 2007-094028 | 4/2007 |

OTHER PUBLICATIONS

"Office Action of Taiwan Counterpart Application", issued on May 9, 2014, p. 1-p. 6, in which the listed references were cited.

* cited by examiner

*Primary Examiner* — Bernard Rojas
(74) *Attorney, Agent, or Firm* — Jianq Chyun IP Office

(57) ABSTRACT

A lead line structure and a display panel having the same are provided. The display panel includes a pixel array, at least one driving device, first and second lead lines, and first and second insulating layers. The first lead lines are electrically connected to the pixel array and the driving device. The first insulating layer covers the first lead lines and has trenches. The second lead lines are electrically connected to the pixel array and the driving device, and located in the trenches of the first insulating layer. The first and second lead lines are alternately arranged. The second insulating layer covers the first insulating layer and the second lead lines. The height of the second insulating layer above the second lead lines is smaller than the height of the second insulating layer above the first lead lines.

22 Claims, 7 Drawing Sheets

LEAD LINE STRUCTURE AND DISPLAY PANEL HAVING THE SAME

CROSS-REFERENCE TO RELATED APPLICATION

This application claims the priority benefit of Taiwan application serial no. 100115771, filed May 5, 2011. The entirety of the above-mentioned patent application is hereby incorporated by reference herein and made a part of this specification.

BACKGROUND OF THE INVENTION

1. Field of the Invention

The invention relates to a lead line structure and a display panel having the same.

2. Description of Related Art

In general, a liquid crystal display (LCD) panel of a liquid crystal display is constituted by a pixel array substrate, a color filter array substrate, and a liquid crystal layer between the two substrates. In the pixel array substrate, lead lines are disposed in a non-display region, so as to electrically connect a pixel array and a driving chip. The lead lines disposed between the pixel array and the driving chip are arranged in a fan-out manner corresponding to a contact point of the driving chip.

As slim border display panels develop, more and more researches are directed to the reduction of the dimensions of fan-out type lead line structures. In consideration of fabrication limit and unwanted short circuit between two adjacent lead lines, adjacent lead lines in the fan-out lead line structures are respectively formed in two metal layers according to the related art. Nonetheless, in said fan-out lead line structures, the lead lines in the upper metal layer are apt to be damaged by external forces in comparison with the lead lines in the lower metal layer during fabrication of the display panel. This is unfavorable to the yield of the display panel.

SUMMARY OF THE INVENTION

The invention is directed to a lead line structure and a display panel having the lead line structure capable of remedying the defects in the conventional fan-out lead line structure, i.e., the lead lines in the upper metal layer are more likely to be damaged than the lead lines in the lower metal layer.

In an embodiment of the invention, a display panel that has a display region and a non-display region is provided. The display panel includes a pixel array, at least one driving device, a plurality of first lead lines, a first insulating layer, a plurality of second lead lines, and a second insulating layer. The pixel array is located in the display region. The driving device is located in the non-display region. The first lead lines are located in the non-display region and electrically connected to the pixel array and the driving device. The first insulating layer covers the first lead lines and has a plurality of trenches therein. The second lead lines are disposed in the non-display region, electrically connected to the pixel array and the driving device, and located in the trenches of the first insulating layer. Besides, the second lead lines and the first lead lines are alternately arranged. The second insulating layer covers the first insulating layer and the second lead lines. The height of the second insulating layer above the second lead lines is smaller than the height of the second insulating layer above the first lead lines.

In an embodiment of the invention, a lead line structure that includes a plurality of first lead lines, a first insulating layer, a plurality of second lead lines, and a second insulating layer is provided. The first insulating layer covers the first lead lines and has a plurality of trenches therein. The second lead lines and the first lead lines are alternately arranged, and the second lead lines are located in the trenches of the first insulating layer. The second insulating layer covers the first insulating layer and the second lead lines. The height of the second insulating layer above the second lead lines is smaller than the height of the second insulating layer above the first lead lines.

Based on the above, the second lead lines are located in the trenches of the first insulating layer, and thereby the height of the second insulating layer above the second lead lines is smaller than the height of the second insulating layer above the first lead lines. That is to say, unlike the first lead lines, the second lead lines cannot be covered by the first and second insulating layers. However, since the height of the second insulating layer above the second lead lines is smaller than the height of the second insulating layer above the first lead lines, the second lead lines are less likely to be damaged.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
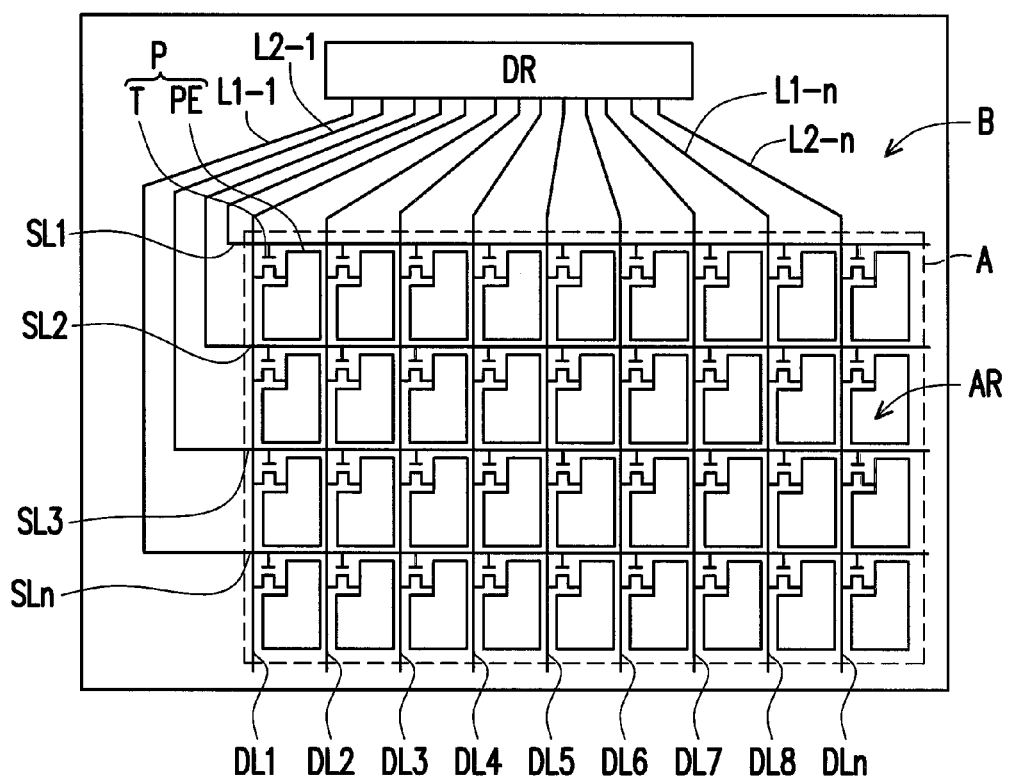
FIG. 1 is a schematic top view illustrating a display panel according to an embodiment of the invention.
Figure 2:
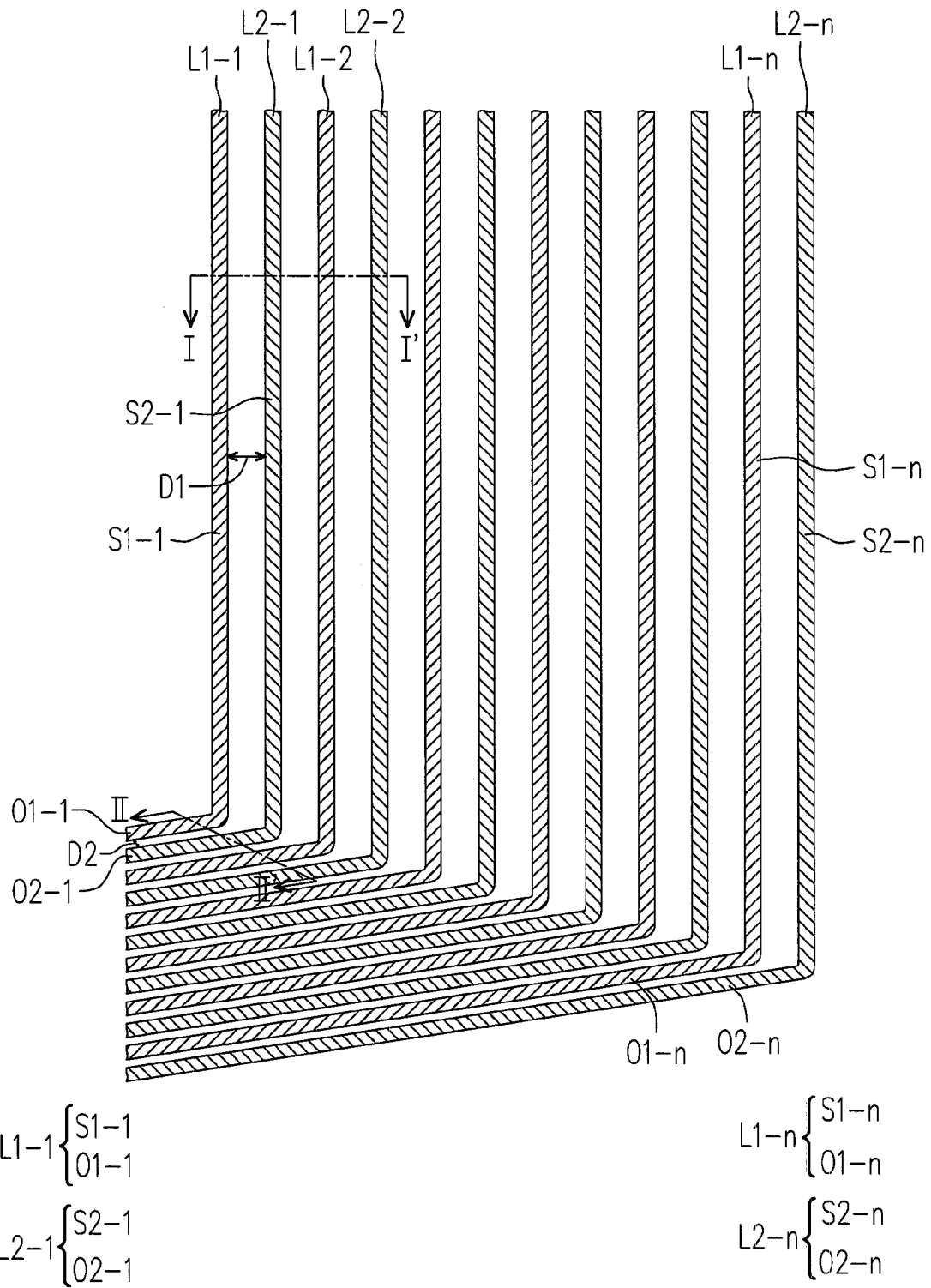
FIG. 2 is a schematic top view illustrating a portion of the lead line structure depicted in FIG. 1.
Figure 3A:
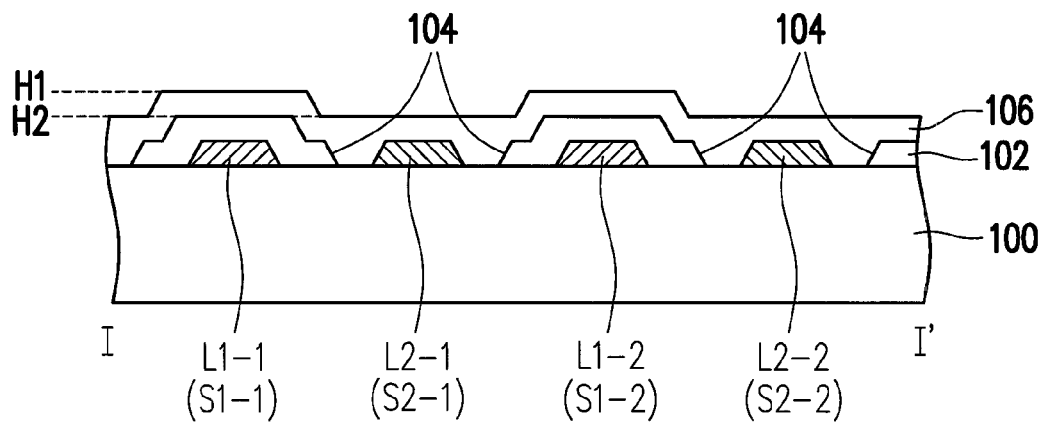
FIG. 3A is a schematic cross-sectional view taken along a sectional line I-I' depicted in FIG. 2.
Figure 3B:
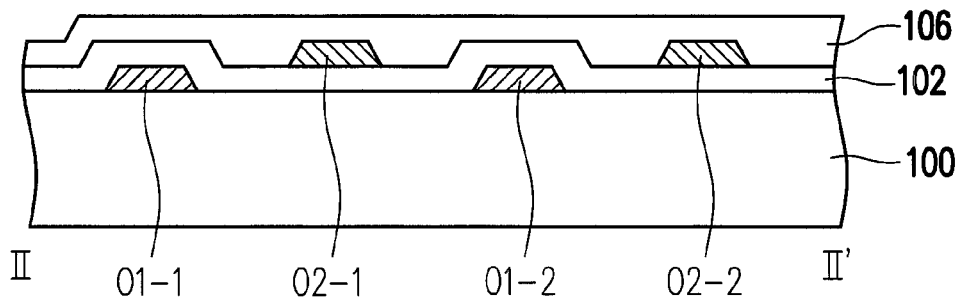
FIG. 3B is a schematic cross-sectional view taken along a sectional line II-II' depicted in FIG. 2.

FIG. 1 is a schematic top view illustrating a display panel according to an embodiment of the invention. FIG. 2 is a schematic top view illustrating a portion of the lead line structure depicted in FIG. 1. FIG. 3A is a schematic cross-sectional view taken along a sectional line I-I' depicted in FIG. 2. FIG. 3B is a schematic cross-sectional view taken along a sectional line II-IF depicted in FIG. 2. With reference to FIG. 1, FIG. 2, FIG. 3A, and FIG. 3B, the display panel of this embodiment includes a display region A and a non-display region B around the display region A. The display panel includes a pixel array AR, at least one driving device DR, a plurality of first lead lines L1-1~L1-n, a first insulating layer 102, a plurality of second lead lines L2-1~L2-n, and a second insulating layer 106.

The pixel array AR is located in the display region A. According to this embodiment, the pixel array AR includes a plurality of scan lines SL1~SLn, a plurality of data lines DL1~DLn, and a plurality of pixel structures P.

The scan lines SL1~SLn and the data lines DL1~DLn are alternately arranged, and an insulating layer is sandwiched between the scan lines SL1~SLn and the data lines DL1~DLn. In other words, extension directions of the data lines DL1~DLn are not parallel to extension directions of the scan lines SL1~SLn. Moreover, it is favorable for the extension directions of the data lines DL1~DLn to be perpendicular to the extension directions of the scan lines SL1~SLn. In consideration of electrical conductivity, the data lines DL1~DLn and the scan lines SL1~SLn are often made of metal materials. However, the invention is not limited thereto. According to other embodiments of the invention, the scan lines SL1~SLn and the data lines DL1~DLn can also be made of other conductive materials. For instance, the scan lines SL1~SLn and the data lines DL1~DLn can be made of an alloy, metal nitride, metal oxide, metal oxynitride, another appropriate material, or a layer in which a metal material and any other conductive material are stacked together.

Each of the pixel structures P includes an active device T and a pixel electrode PE. The active device T can be a bottom-gate thin film transistor (TFT) or a top-gate TFT, and the active device T includes a gate, a channel, a source, and a drain. The active device T is electrically connected to a corresponding one of the scan lines SL1~SLn and a corresponding one of the data lines DL1~DLn. Besides, the active device T is electrically connected to the pixel electrode PE.

The driving device DR is located in the non-display region B. Here, the driving device DR can provide the pixel array AR with specific driving signals, so as to control the pixel array AR to display certain images. In this embodiment, the driving device DR is disposed at one side of the display region A, which should not be construed as a limitation to the invention. According to other embodiments of the invention, the driving device can also be disposed at two sides of the display region A or disposed at the periphery of the display region A.

The first lead lines L1-1~L1-n and the second lead lines L2-1~L2-n are located in the non-display region B and electrically connected to the pixel array AR and the driving device DR. Here, the first lead lines L1-1~L1-n and the second lead lines L2-1~L2-n are electrically connected to the corresponding scan lines SL1~SLn and the corresponding data lines DL1~DLn, respectively. Namely, the driving signals of the driving device DR can be transmitted to the pixel array AR through the first lead lines L1-1~L1-n and the second lead lines L2-1~L2-n. Besides, the first lead lines L1-1~L1-n and the second lead lines L2-1~L2-n are alternately arranged, i.e., the first lead lines L1-1~L1-n and the second lead lines L2-1~L2-n are arranged in the following order from left to right: the first lead line L1-1, the second lead line L2-1, the first lead line L1-2, the second lead line L2-2, . . . , the first lead line L1-n, and the second lead line L2-n.

Similarly, in consideration of electrical conductivity, the first lead lines L1-1~L1-n and the second lead lines L2-1~L2-n are often made of metal materials. However, the first lead lines L1-1~L1-n and the second lead lines L2-1~L2-n can also be made of other conductive materials in other embodiments, which should not be construed as a limitation to the invention. For instance, the first lead lines L1-1~L1-n and the second lead lines L2-1~L2-n can be made of an alloy, metal nitride, metal oxide, metal oxynitride, another appropriate material, or a layer in which a metal material and any other conductive material are stacked together. In addition, the line width of each of the first lead lines L1-1~L1-n and the second lead lines L2-1~L2-n is approximately 3 μm~6 μm, respectively. Based on the actual design requirements, the line width of each of the first lead lines L1-1~L1-n can be substantially the same as or different from the line width of each of the second lead lines L2-1~L2-n.

As shown in FIG. 2, the first lead lines L1-1~L1-n of this embodiment include first straight portions S1-1~S1-n and first oblique portions O1-1~O1-n connected to the first straight portions S1-1~S1-n. Namely, the first lead line L1-1 includes the first straight portion S1-1 and the first oblique portion O1-1, the first lead line L1-2 includes the first straight portion S1-2 and the first oblique portion O1-2, and the first lead line L1-n includes the first straight portion S1-n and the first oblique portion O1-n. Extension directions of the first straight portions S1-1~S1-n are not parallel to extension directions of the first oblique portions O1-1~O1-n. In other words, the included angles between the extension directions of the first straight portions S1-1~S1-n and the extension directions of the first oblique portions O1-1~O1-n are not 0 degree or 180 degrees. The line width of each of the first straight portions S1-1~S1-n is substantially the same as the line width of each of the first oblique portions O1-1~O1-n, which should not be construed as a limitation to the invention.

Similarly, the second lead lines L2-1~L2-n of this embodiment include second straight portions S2-1~S2-n and second oblique portions O2-1~O2-n connected to the second straight portions S2-1~S2-n. Namely, the second lead line L2-1 includes the second straight portion 52-1 and the second oblique portion O2-1, the second lead line L2-2 includes the second straight portion S2-2 and the second oblique portion O2-2, and the second lead line L2-n includes the second straight portion S2-n and the second oblique portion O2-n. Extension directions of the second straight portions S2-1~S2-n are not parallel to extension directions of the second oblique portions O2-1~O2-n. In other words, the included angles between the extension directions of the second straight portions S2-1~S2-n and the extension directions of the second oblique portions O2-1~O2-n are not 0 degree or 180 degrees. The line width of each of the second straight portions S2-1~S2-n is substantially the same as the line width of each of the second oblique portions O2-1~O2-n, which should not be construed as a limitation to the invention.

In this embodiment, the first straight portions S1-1~S1-n of the first lead lines L1-1~L1-n are parallel to the second straight portions S2-1~S2-n of the second lead lines L2-1~L2-n, and the first straight portions S1-1~S1-n of the first lead lines L1-1~L1-n and the second straight portions S2-1~S2-n of the second lead lines L2-1~L2-n are extended toward and electrically connected to the driving device DR. The first oblique portions O1-1~O1-n of the first lead lines L1-1~L1-n are parallel to the second oblique portions O2-1~O2-n of the second lead lines L2-1~L2-n, and the first oblique portions O1-1~O1-n of the first lead lines L1-n and the second oblique portions O2-1~O2-n of the second lead lines L2-1~L2-n are extended toward and electrically connected to the pixel array AR.

Specifically, there is a first distance D1 between each of the first straight portions S1-1~S1-n of the first lead lines L1-1~L1-n and the adjacent one of the second straight portions S2-1~S2-n of the second lead lines L2-1~L2-n. For instance, the distance D1 exists between the first straight portion S1-1 and the second straight portion S2-1. Besides, there is a second distance D2 between each of the first oblique portions O1-1~O1-n of the first lead lines L1-1~L1-n and the adjacent one of the second oblique portions O2-1~O2-n of the second lead lines L2-1~L2-n. For instance, the distance D2 exists between the first oblique portion O1-1 and the second oblique portion O2-1. The first distance D1 is substantially greater than the second distance D2. For instance, the first distance D1 is approximately 10 µm~20 µm, and the second distance D2 is approximately 1.5 µm~6 µm.

Therefore, the arrangement of the first straight portions S1-1~S1-n of the first lead lines L1-1~L1-n and the second straight portions S2-1~S2-n of the second lead lines L2-1~L2-n are not as dense as the arrangement of the first oblique portions O1-1~O1-n of the first lead lines L1-1~L1-n and the second oblique portions O2-1~O2-n of the second lead lines L2-1~L2-n.

In particular, as indicated in FIG. 3A, the first lead lines L1-1~L1-n are located on the substrate 100, and the first insulating layer 102 covers the first lead lines L1-1~L1-n. The first insulating layer 102 can be made of an inorganic material (e.g., silicon oxide, silicon nitride, silicon oxynitride, any other suitable material, or a stacked layer containing at least two of the above materials), an organic material, any other suitable material, or a combination of the above.

The first insulating layer 102 has a plurality of trenches 104 therein. In this embodiment, bottoms of the trenches 104 expose the substrate 100. However, the invention is not limited thereto. The trenches 104 in other embodiments of the invention may not penetrate the first insulating layer 102.

The second lead lines L2-1~L2-n are respectively disposed in the trenches 104 of the first insulating layer 102. Given the bottoms of the trenches 104 expose the substrate 100, the second lead lines L2-1~L2-n are in direct contact with the surface of the substrate 100. By contrast, given the trenches 104 do not penetrate the first insulating layer 102, the second lead lines L2-1~L2-n are in contact with the first insulating layer 102 in the trenches 104.

The second insulating layer 106 covers the first insulating layer 102 and the second lead lines L2-1~L2-n. Similarly, the second insulating layer 106 can be made of an inorganic material (e.g., silicon oxide, silicon nitride, silicon oxynitride, any other suitable material, or a stacked layer containing at least two of the above materials), an organic material, any other suitable material, or a combination of the above.

As stated above, the first lead lines L1-1~L1-n are covered and protected by the first and second insulating layers 102 and 106, while the second lead lines L2-1~L2-n are covered by the second insulating layer 106. Since the second lead lines L2-1~L2-n are disposed in the trenches 104 of the first insulating layer 102, the height H2 of the second insulating layer 106 above the second lead lines L2-1~L2-n is substantially smaller than the height H1 of the second insulating layer 106 above the first lead lines L1-1~L1-n. Namely, even though the second lead lines L2-1~L2-n cannot be covered by two insulating layers, the second lead lines L2-1~L2-n are not apt to be directly damaged by external forces. This is because the height H2 of the second insulating layer 106 above the second lead lines L2-1~L2-n is substantially smaller than the height H1 of the second insulating layer 106 above the first lead lines L1-1~L1-n. Once the external forces are applied to the lead line structure, the second insulating layer 106 above the first lead lines L1-1~L1-n is affected at first, and thereby the second lead lines L2-1~L2-n are less likely to be damaged directly by external forces.

Note that the second distance D2 of this embodiment is relatively short, and thus the second straight portions S2-1~S2-n of the second lead lines L2-1~L2-n are disposed in the trenches 104 according to this embodiment, so as to prevent short circuit between the first oblique portions O1-1~O1-n of the first lead lines L1-1~L1-n and the adjacent second oblique portions O2-1~O2-n of the second lead lines L2-1~L2-n. In other words, the trenches 104 of the first insulating layer 102 are formed corresponding to the second straight portions S2-1~S2-n of the second lead lines L2-1~L2-n, as shown in FIG. 3A. The second oblique portions O2-1~O2-n of the second lead lines L2-1~L2-n are disposed on the surface of the first insulating layer 102, as indicated in FIG. 3B.

Nonetheless, in other embodiments of the invention, if the second distance D2 between each of the first oblique portions O1-1~O1-n of the first lead lines L1-1~L1-n and the adjacent one of the second oblique portions O2-1~O2-n of the second lead lines L2-1~L2-n is sufficient, and short circuit does not occur between the first oblique portions O1-1~O1-n and the adjacent second oblique portions O2-1~O2-n, the second straight portions S2-1~S2-n and the second oblique portions O2-1~O2-n of the second lead lines L2-1~L2-n can all be disposed in the trenches 104. That is to say, the trenches 104 of the first insulating layer 102 are formed corresponding to the second lead lines L2-1~L2-n.

Figure 4:
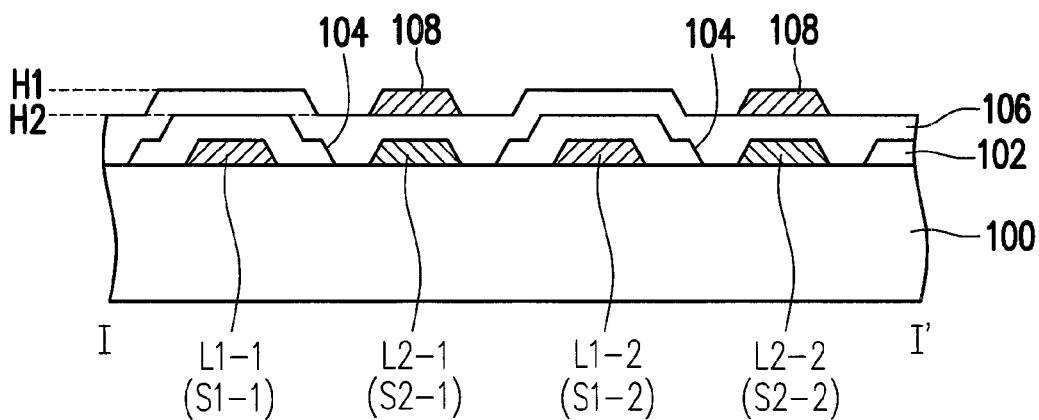
FIG. 4 is a schematic cross-sectional view illustrating a lead line structure according to another embodiment of the invention.

FIG. 4 is a schematic cross-sectional view illustrating a lead line structure according to another embodiment of the invention. The lead line structure shown in FIG. 4 is similar to that shown in FIG. 3A, and thus same components in FIG. 4 and FIG. 3A are represented by the same numerals and not repeated herein. In the embodiment shown in FIG. 4, the lead line structure further includes a cover layer 108 that is disposed on the second insulating layer 106 above the second lead lines L2-1~L2-n. The cover layer 108 can be made of a metal material, a metal oxide material, an insulating material, or any other appropriate material. When the cover layer 108 is disposed on the second insulating layer 106 above the second lead lines L2-1~L2-n, the second lead lines L2-1~L2-n can be further protected from being damaged by external forces.

According to this embodiment, the second straight portions S2-1~S2-n of the second lead lines L2-1~L2-n are disposed in the trenches 104, and the cover layer 108 is disposed on the second insulating layer 106 above the second straight portions S2-1 S2-n of the second lead lines L2-1~L2-n, for instance. However, the invention is not limited thereto. In other embodiments of the invention, if the second straight portions S2-1~S2-n and the second oblique portions O2-1~O2-n of the second lead lines L2-1~L2-n are all disposed in the trenches 104 of the first insulating layer 102, the cover layer 108 can be correspondingly disposed on the second insulating layer 106 above the second straight portions S2-1~S2-n and the second oblique portions O2-1~O2-n of the second lead lines L2-1~L2-n.

Figure 5:
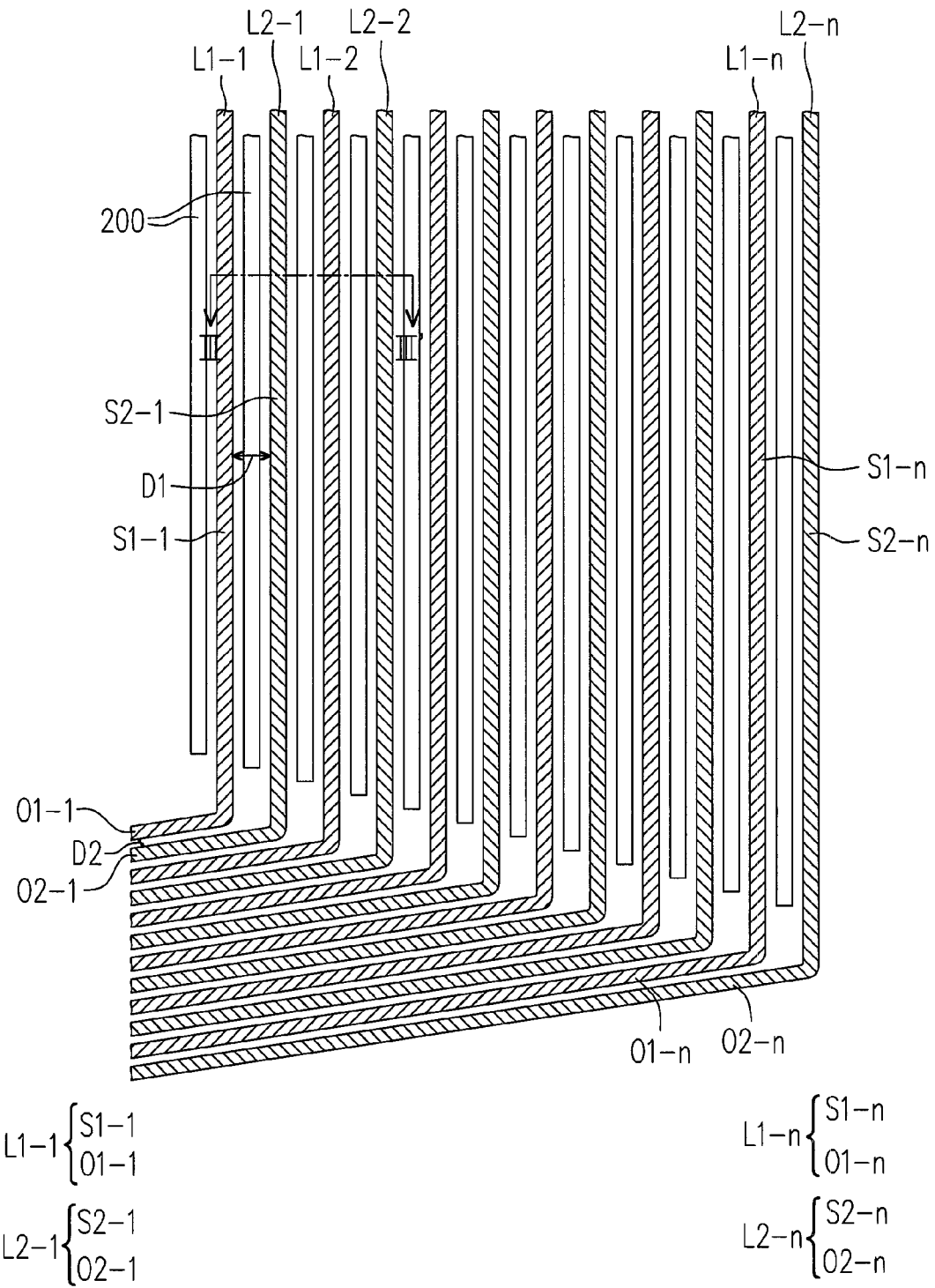
FIG. 5 is a schematic top view illustrating a portion of a lead line structure according to another embodiment of the invention.
Figure 6:
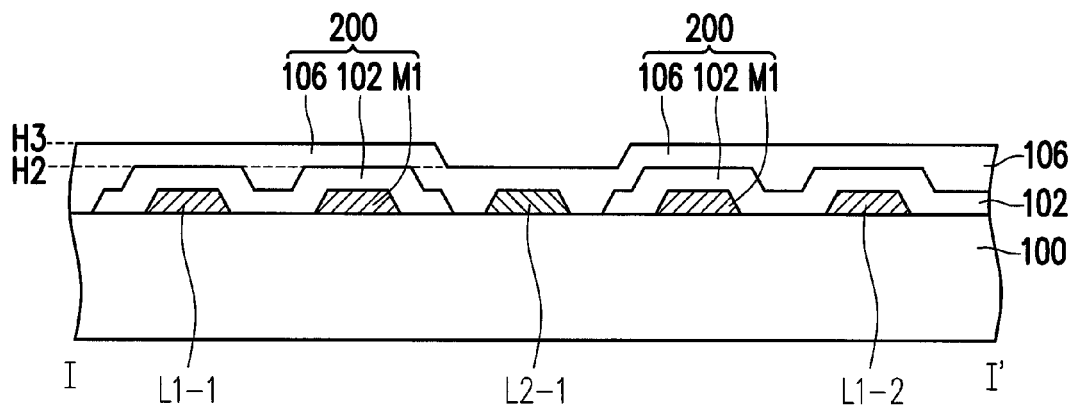
FIG. 6 is a schematic cross-sectional view taken along a sectional line depicted in FIG. 5.

FIG. 5 is a schematic top view illustrating a portion of a lead line structure according to another embodiment of the invention. FIG. 6 is a schematic cross-sectional view taken along a sectional line depicted in FIG. 5. With reference to FIG. 5 and FIG. 6, the lead line structure of this embodiment is similar to the lead line structure shown in FIG. 2, and thus the same components in these drawings are denoted by the same numerals and are not reiterated herein. In the embodiment shown in FIG. 5 and FIG. 6, the lead line structure further includes a plurality of protection structures 200 located between the second lead lines L2-1~L2-n and the adjacent first lead lines L1-1~L1-n. For instance, the protection structure 200 is disposed between the second lead line L2-1 and the first lead line L1-1 and between the second lead line L2-1 and the first lead line L1-2.

Specifically, the height H3 of each protection structure 200 is substantially greater than the height H2 of the second insulating layer 106 above the second lead lines L2-1~L2-n. According to this embodiment, the protection structures 200 are constituted by stacking a plurality of film layers. The film layers can be made of metal materials, insulating materials, semiconductor materials, metal oxide materials, and so forth, which is mainly determined based on the manufacturing process of the pixel array AR of the display panel and the material of the pixel array AR. As indicated in FIG. 6, each of the protection structures 200 of this embodiment is constituted by stacking a conductive pattern M1, the first insulating layer 102, and the second insulating layer 106. The conductive pattern M1 is made of a metal material, for instance, and the metal material can be the same as the material of the first lead lines L1-1~L1-n.

In view of the above, each protection structure 200 is constituted by stacking the conductive pattern M1, the first insulating layer 102, and the second insulating layer 106, and the second lead lines L2-1~L2-n are merely covered by the second insulating layer 106. Accordingly, the height H3 of each protection structure 200 is substantially greater than the height H2 of the second insulating layer 106 above the second lead lines L2-1~L2-n. As such, when external forces are applied to the lead line structure, the protection structures 200 are firstly affected by the external forces, so as to prevent the second lead lines L2-1~L2-n from being damaged.

If the uppermost film layer of the film layers in each protection structure 200 is made of an insulating material, short circuit of the lead lines at respective sides of each protection structure 200 can be prevented. However, the invention is not limited thereto. If the distance between each protection structure 200 and the lead lines at the respective sides of the protection structure 200 is sufficient, the uppermost layer of the protection structure 200 is not required to be made of the insulating material.

According to this embodiment, the protection structures 200 are disposed between the second straight portions S2-1~S2-n of the second lead lines L2-1~L2-n and the first straight portions S1-1~S1-n of the adjacent the first lead lines L1-1~L1-n. For instance, the protection structure 200 is disposed between the second straight portion S2-1 of the second lead line L2-1 and the first straight portion S1-1 of the first lead line L1-1 and between the second straight portion S2-1 of the second lead line L2-1 and the first straight portion S1-2 of the first lead line L1-2. Besides, the height of each protection structure 200 is greater than the height of each of the second straight portions S2-1~S2-n of the second lead lines L2-1~L2-n. However, the invention is not limited thereto.

According to other embodiments of the invention, if the second distance D2 between each of the first oblique portions O1-1~O1-n of the first lead lines L1-1~L1-n and the adjacent one of the second oblique portions O2-1~O2-n of the second lead lines L2-1~L2-n is sufficient, the protection structures 200 can be further disposed between the second oblique portions O2-1~O2-n of the second lead lines L2-1~L2-n and the first oblique portions O1-1~O1-n of the adjacent first lead lines L1-1~L1-n.

Figure 7:
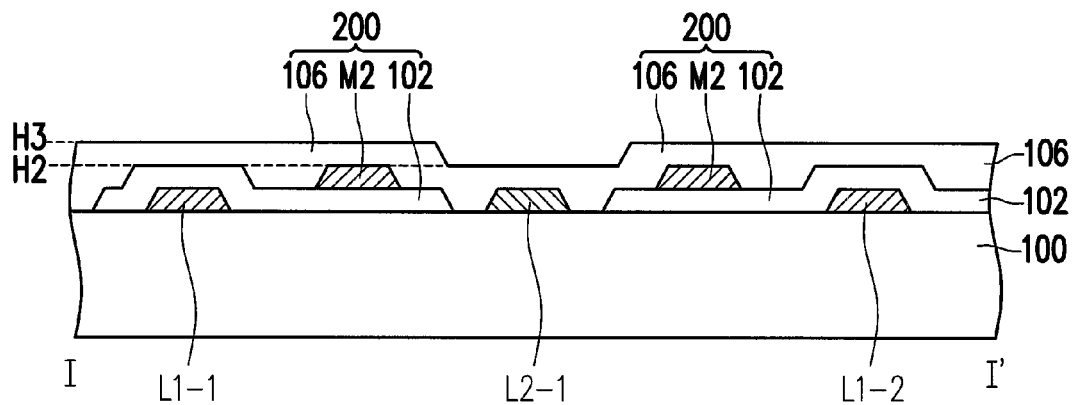
FIG. 7 is a schematic cross-sectional view illustrating a lead line structure according to another embodiment of the invention.

FIG. 7 is a schematic cross-sectional view illustrating a lead line structure according to another embodiment of the invention. With reference to FIG. 7, the lead line structure of this embodiment is similar to the lead line structure shown in FIG. 6, and thus the same components in these drawings are denoted by the same numerals and are not reiterated herein. As indicated in FIG. 7, each of the protection structures 200 of this embodiment is constituted by stacking the first insulating layer 102, a conductive pattern M2, and the second insulating layer 106. The conductive pattern M2 is made of a metal material, for instance, and the metal material herein can be the same as the material of the second lead lines L2-1~L2-n.

Since each protection structure 200 is constituted by stacking the first insulating layer 102, the conductive pattern M2, and the second insulating layer 106, and the second lead lines L2-1~L2-n are merely covered by the second insulating layer 106, the height H3 of each protection structure 200 is substantially greater than the height H2 of the second insulating layer 106 above the second lead lines L2-1~L2-n. As such, when external forces are applied to the lead line structure, the protection structures 200 are firstly affected by the external forces, so as to prevent the second lead lines L2-1~L2-n from being damaged.

Figure 8:
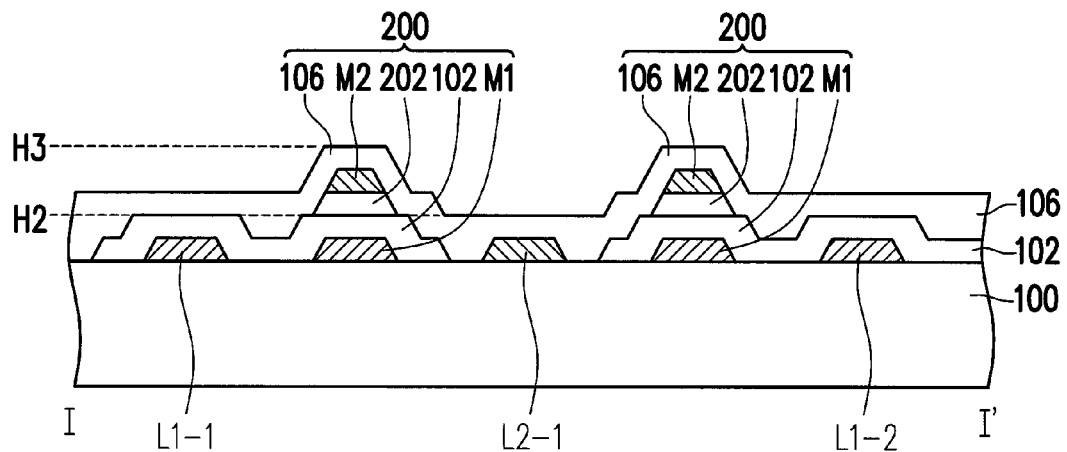
FIG. 8 is a schematic cross-sectional view illustrating a lead line structure according to another embodiment of the invention.

FIG. 8 is a schematic cross-sectional view illustrating a lead line structure according to another embodiment of the invention. With reference to FIG. 8, the lead line structure of this embodiment is similar to the lead line structure shown in FIG. 6, and thus the same components in these drawings are denoted by the same numerals and are not reiterated herein. As indicated in FIG. 8, each of the protection structures 200 of this embodiment is constituted by stacking the conductive pattern M1, the first insulating layer 102, an intermediate layer 202, the conductive pattern M2, and the second insulating layer 106. The conductive pattern M1 is made of a metal material, for instance, and the metal material herein can be the same as the material of the first lead lines L1-1~L1-n. The intermediate layer 202 is made of a semiconductor material, for instance, and the semiconductor material can be amorphous silicon, polysilicon, micro-silicon, or a doped silicon material. The conductive pattern M2 is made of a metal material, and the metal material herein can be the same as the material of the second lead lines L2-1~L2-n.

Since each protection structure 200 is constituted by stacking the conductive pattern M1, the first insulating layer 102, the intermediate layer 202, the conductive pattern M2, and the second insulating layer 106, and the second lead lines L2-1~L2-n are merely covered by the second insulating layer 106, the height H3 of each protection structure 200 is apparently greater than the height H2 of the second insulating layer 106 above the second lead lines L2-1~L2-n. As such, when external forces are applied to the lead line structure, the protection structures 200 are firstly affected by the external forces, so as to prevent the second lead lines L2-1~L2-n from being damaged.

Figure 9:
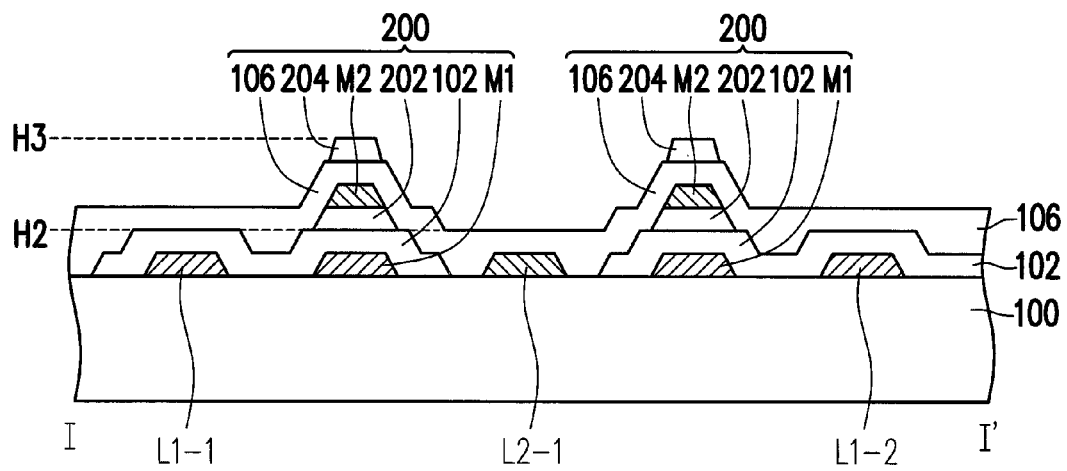
FIG. 9 is a schematic cross-sectional view illustrating a lead line structure according to another embodiment of the invention.

FIG. 9 is a schematic cross-sectional view illustrating a lead line structure according to another embodiment of the invention. With reference to FIG. 9, the lead line structure of this embodiment is similar to the lead line structure shown in FIG. 6, and thus the same components in these drawings are denoted by the same numerals and are not reiterated herein. As indicated in FIG. 9, each of the protection structures 200 of this embodiment is constituted by stacking the conductive pattern M1, the first insulating layer 102, the intermediate layer 202, the conductive pattern M2, the second insulating layer 106, and a cover layer 204. The conductive pattern M1 is made of a metal material, for instance, and the metal material herein can be the same as the material of the first lead lines L1-1~L1-n. The intermediate layer 202 is made of a semiconductor material, for instance, and the semiconductor material can be amorphous silicon, polysilicon, micro-silicon, or a doped silicon material. The conductive pattern M2 is made of a metal material, and the metal material herein can be the same as the material of the second lead lines L2-1~L2-n.

The cover layer 204 is made of a metal oxide material or an insulating material, for instance.

Since each protection structure 200 is constituted by stacking the conductive pattern M1, the first insulating layer 102, the intermediate layer 202, the conductive pattern M2, the second insulating layer 106, and the cover layer 204, and the second lead lines L2-1~L2-n are merely covered by the second insulating layer 106, the height H3 of each protection structure 200 is apparently greater than the height H2 of the second insulating layer 106 above the second lead lines L2-1~L2-n. As such, when external forces are applied to the lead line structure, the protection structures 200 are firstly affected by the external forces, so as to prevent the second lead lines L2-1~L2-n from being damaged.

In the embodiment shown in FIG. 1, the driving device DR is disposed at a side of the display region A, and the scan lines SL1~SLn and the data lines DL1~DLn are electrically connected to the driving device DR. By contrast, in the display panel described in the following embodiments, the driving devices are disposed at two sides of the display region A, and the scan lines SL1~SLn and the data lines DL1~DLn are electrically connected to the corresponding driving devices, respectively.

Figure 10:
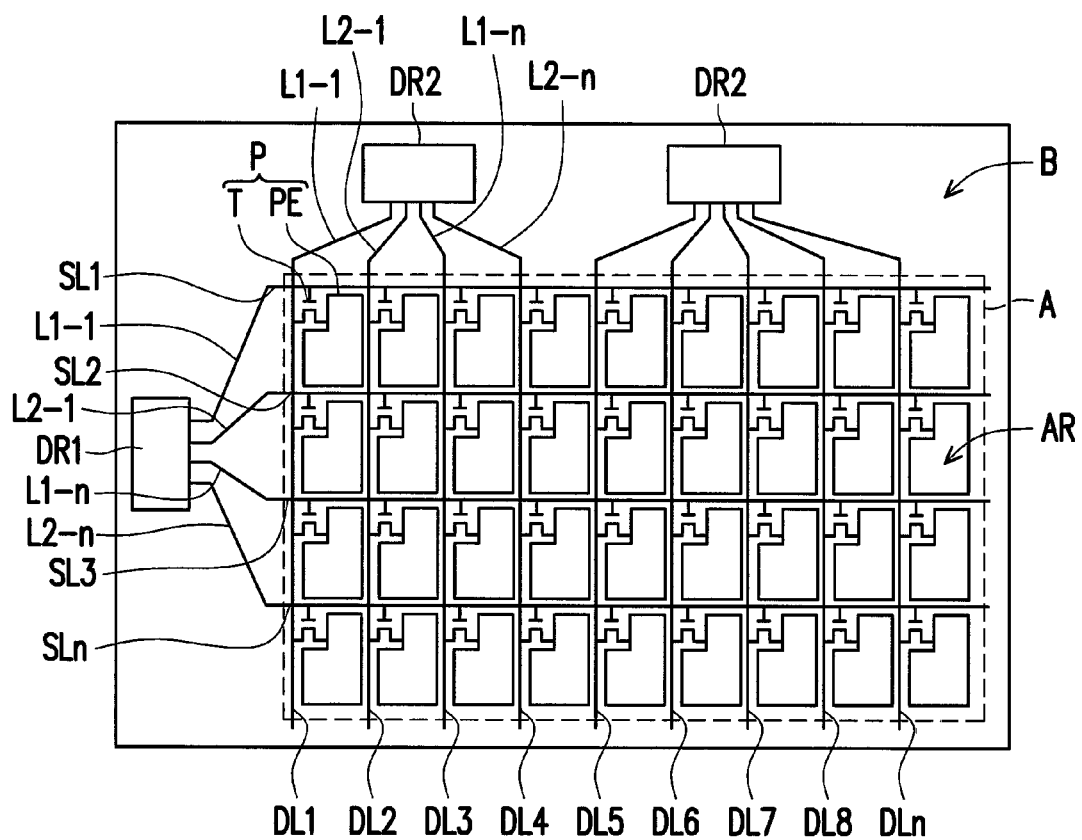
FIG. 10 is a schematic top view illustrating a display panel according to another embodiment of the invention.

FIG. 10 is a schematic top view illustrating a display panel according to another embodiment of the invention. This embodiment is similar to the embodiment shown in FIG. 1, and thus the same components in these drawings are denoted by the same numerals and are not reiterated herein. With reference to FIG. 10, the driving devices DR1 and DR2 of this embodiment are located in the non-display region B at two respective sides of the display region A, and the driving devices DR1 and DR2 can provide the pixel array AR with specific driving signals, so as to control the driving devices DR1 and DR2 to display certain images.

The first lead lines L1-1~L1-n and the second lead lines L2-1~L2-n are located in the non-display region B and electrically connected to the pixel array AR and the driving devices DR1 and DR2. Similarly, the driving signals of the driving devices DR1 and DR2 can be transmitted to the pixel array AR through the first lead lines L1-1~L1-n and the second lead lines L2-1~L2-n. Besides, the first lead lines L1-1~L1-n and the second lead lines L2-1~L2-n are alternately arranged, i.e., the first lead lines L1-1~L1-n and the second lead lines L2-1~L2-n are arranged in the following order from left to right: the first lead line L1-1, the second lead line L2-1, the first lead line L1-2, the second lead line L2-2, . . . , the first lead line L1-n, and the second lead line L2-n.

In particular, the lead line structure (including the first lead lines L1-1~L1-n and the second lead lines L2-1~L2-n) in the display panel depicted in FIG. 10 can be the lead line structure described in any embodiment shown in FIG. 2 to FIG. 9.

In light of the foregoing, the second lead lines are located in the trenches of the first insulating layer, and thereby the height of the second insulating layer above the second lead lines is substantially smaller than the height of the second insulating layer above the first lead lines. That is to say, unlike the first lead lines, the second lead lines cannot be covered by the first and second insulating layers. However, since the height of the second insulating layer above the second lead lines is substantially smaller than the height of the second insulating layer above the first lead lines, the second lead lines are less likely to be damaged.

Moreover, if the protection structures are disposed between the second lead lines and the adjacent first lead lines, the protection structures can further protect the second lead lines from being damaged by external forces.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel having a display region and a non-display region, the display panel comprising:
    a pixel array located in the display region;
    at least one driving device located in the non-display region;
    a plurality of first lead lines located in the non-display region and electrically connected to the pixel array and the at least one driving device;
    a first insulating layer covering the first lead lines, the first insulating layer having a plurality of trenches therein;
    a plurality of second lead lines located in the non-display region and electrically connected to the pixel array and the at least one driving device, the second lead lines and the first lead lines being alternately arranged, the second lead lines being disposed in the trenches of the first insulating layer;
    a second insulating layer covering the first insulating layer and the second lead lines, wherein a height of the second insulating layer above the second lead lines is smaller than a height of the second insulating layer above the first lead lines.

2. The display panel as recited in claim 1, further comprising a cover layer located on the second insulating layer above the second lead lines.

3. The display panel as recited in claim 1, further comprising a plurality of protection structures respectively located between the second lead lines and the first lead lines adjacent to the second lead lines.

4. The display panel as recited in claim 3, wherein a height of each of the protection structures is greater than a height of the second insulating layer above the second lead lines.

5. The display panel as recited in claim 3, wherein each of the protection structures is constituted by stacking a plurality of film layers, and an uppermost film layer of the film layers is an insulating material.

6. The display panel as recited in claim 1,
    each of the first lead lines comprising:
        a first straight portion; and
        a first oblique portion connected to the first straight portion;
    each of the second lead lines comprising:
        a second straight portion; and
        a second oblique portion connected to the second straight portion,
    wherein a first distance between the first straight portion of each of the first lead lines and the second straight portion of one of the second lead lines adjacent thereto is greater than a second distance between the first oblique portion of each of the first lead lines and the second oblique portion of one of the second lead lines adjacent thereto.

7. The display panel as recited in claim 6, wherein the second straight portions of the second lead lines are disposed in the trenches of the first insulating layer, and the second oblique portions of the second lead lines are disposed on the first insulating layer.

8. The display panel as recited in claim 6, wherein the first distance ranges from about 10 µm to about 20 µm, and the second distance ranges from about 1.5 µm to about 6 µm.

9. The display panel as recited in claim 6, further comprising a plurality of protection structures, each of the protection structures being located between the second straight portion of each of the second lead lines and the first straight portion of one of the first lead lines adjacent thereto.

10. The display panel as recited in claim 9, wherein a height of each of the protection structures is greater than a height of each of the second straight portions of the second lead lines.

11. The display panel as recited in claim 9, wherein each of the protection structures is constituted by stacking a plurality of film layers, and an uppermost film layer of the film layers is an insulating material.

12. A lead line structure comprising:
a plurality of first lead lines;
a first insulating layer covering the first lead lines, the first insulating layer having a plurality of trenches therein;
a plurality of second lead lines, the second lead lines and the first lead lines being arranged alternately, the second lead lines being located in the trenches of the first insulating layer;
a second insulating layer covering the first insulating layer and the second lead lines, wherein a height of the second insulating layer above the second lead lines is smaller than a height of the second insulating layer above the first lead lines.

13. The lead line structure as recited in claim 12, further comprising a cover layer located on the second insulating layer above the second lead lines.

14. The lead line structure as recited in claim 12, further comprising a plurality of protection structures located between the second lead lines and the first lead lines adjacent to the second lead lines.

15. The lead line structure as recited in claim 14, wherein a height of each of the protection structures is greater than a height of the second insulating layer above the second lead lines.

16. The lead line structure as recited in claim 14, wherein each of the protection structures is constituted by stacking a plurality of film layers, and an uppermost film layer of the film layers is an insulating material.

17. The lead line structure as recited in claim 12,
each of the first lead lines comprising:
a first straight portion; and
a first oblique portion connected to the first straight portion;
each of the second lead lines comprising:
a second straight portion; and
a second oblique portion connected to the second straight portion,
wherein a first distance between the first straight portion of each of the first lead lines and the second straight portion of one of the second lead lines adjacent thereto is greater than a second distance between the first oblique portion of each of the first lead lines and the second oblique portion of one of the second lead lines adjacent thereto.

18. The lead line structure as recited in claim 17, wherein the second straight portions of the second lead lines are disposed in the trenches of the first insulating layer, and the second oblique portions of the second lead lines are disposed on the first insulating layer.

19. The lead line structure as recited in claim 17, wherein the first distance ranges from about 10 μm to about 20 μm, and the second distance ranges from about 1.5 μm to about 6 μm.

20. The lead line structure as recited in claim 17, further comprising a plurality of protection structures, each of the protection structures being located between the second straight portion of each of the second lead lines and the first straight portions of one of the first lead lines adjacent thereto.

21. The lead line structure as recited in claim 20, wherein a height of each of the protection structures is greater than a height of each of the second straight portions of the second lead lines.

22. The lead line structure as recited in claim 20, wherein each of the protection structures is constituted by stacking a plurality of film layers, and an uppermost film layer of the film layers is an insulating material.

* * * * *